R. C. BAKER.
PNEUMATIC CLEANING IMPLEMENT.
APPLICATION FILED OCT. 26, 1909.
983,971.
Patented Feb. 14, 1911.
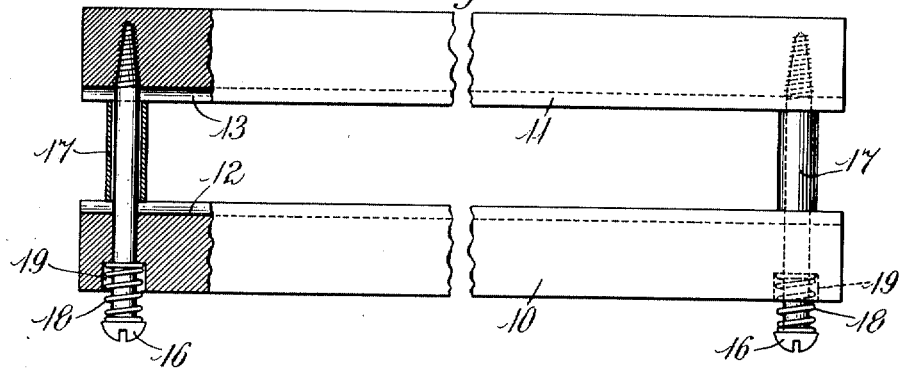
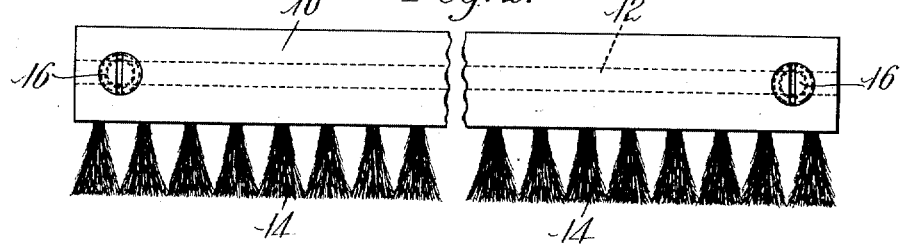
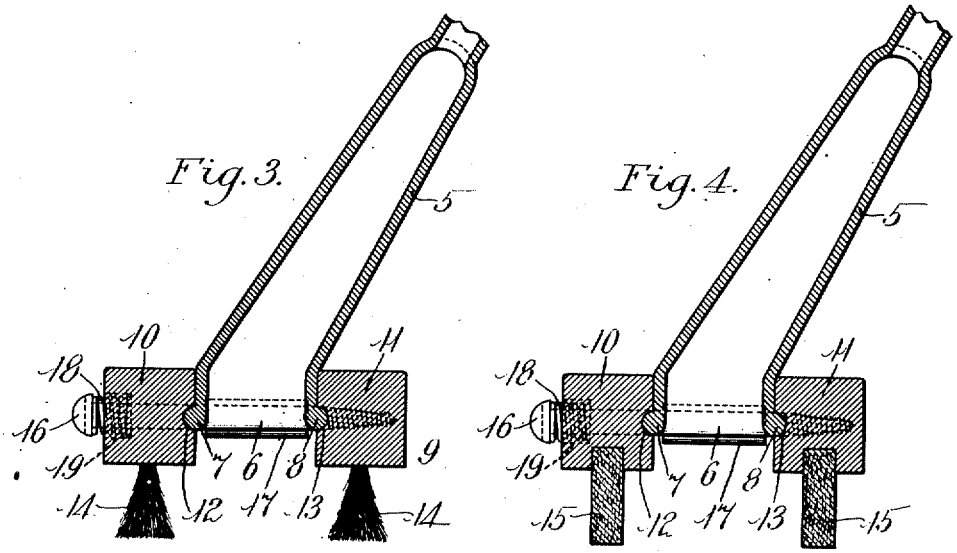

UNITED STATES PATENT OFFICE.

ROY C. BAKER, OF BOSTON, MASSACHUSETTS.

PNEUMATIC CLEANING IMPLEMENT.

983,971.  Specification of Letters Patent.  Patented Feb. 14, 1911.

Application filed October 26, 1909. Serial No. 524,664.

*To all whom it may concern:*

Be it known that I, ROY C. BAKER, a citizen of the United States, residing at Boston, in the county of Suffolk and State of Massachusetts, have invented new and useful Improvements in Pneumatic Cleaning Implements, of which the following is a specification.

This invention relates to improvements in pneumatic vacuum apparatus for cleaning carpets, floors, walls, draperies, and other surfaces, and the object is to provide a device combining in one implement a suction head or nozzle and a tool having means whereby the same is adapted to be easily, quickly and conveniently attached to and detached from the suction head, such tool having thereon a brush, a felt pad or other suitable device according to the nature of the surface to be cleaned.

The invention consists in the novel features of construction and in the combination and arrangement of parts set forth in the following specification and particularly pointed out in the claims.

Referring to the drawings: Figure 1 is a plan of a tool forming a part of a pneumatic cleaning implement embodying my invention. Fig. 2 is a front elevation of the same. Fig. 3 is a vertical sectional view of the complete implement including the hollow suction head and the tool which is attachably and detachably attached thereto, said tool having brush fiber or bristles thereon. Fig. 4 is a view similar to Fig. 3 except that the tool is shown as provided with a pair of felt pads in place of the bristles.

Like numerals refer to like parts throughout the several views of the drawings.

In the drawings, 5 is a hollow suction head or nozzle of suitable form having an inlet orifice 6 and provided adjacent to said orifice with laterally extending rounded beads 7 and 8 on opposite sides thereof. Embracing the suction head 5 is a tool 9, said tool having two relatively movable parts 10 and 11 preferably provided, respectively, with grooves 12 and 13 which receive the beads 7 and 8, respectively. The two members 10 and 11 which may be formed of wood or other suitable material may be provided with any suitable pad or brush and in Figs. 2 and 3 are shown as being provided with tufts of bristles 14, while in Fig. 4 are shown as provided with felt pads 15. The two members 10 and 11 are connected to each other by rods 16, 16 and for convenience of manufacture and assembling these rods consist of wood screws which are screwed into the member 11 and have a sliding fit in the member 10.

Surrounding the screws 16, respectively, are sleeves 17 serving as a means for limiting the movement of the members 10 and 11 toward each other. Interposed between the heads of the screws 16 and the member 10 are helical compression springs 18 which may, if desired, be seated in recesses 19 provided in the member 10, these springs serving to urge the members 10 and 11 toward each other, or, in other words, serving as a resilient means to hold the tool 9 on the head 5 in such a manner as to render it easy and convenient to attach the tool to the head and detach the same therefrom.

In attaching the tool to the suction head, the two members 10 and 11 are sprung apart and the head inserted therebetween, said members being released and allowed to engage said head, as shown in Figs. 3 and 4, with the beads 7 and 8 located in the grooves 12 and 13, respectively, thus preventing accidental displacement of the tool on the head. When thus assembled, the implement is passed to and fro over the surface to be cleansed, such as hard wood floors, walls and other hard surfaces and the dust is drawn into the suction head in the usual and well-known manner.

When it is desired to use the device for cleaning surfaces of carpets, rugs, draperies and other goods of like nature, the tool 9 is removed from the holder 5 and the head is then used in direct contact with the article to be cleaned and for this purpose the beads 7 and 8 are rounded, as shown, so as to easily pass over the surface being cleaned without injuring the same.

The means for attaching the tool to the head renders its removal and replacement a matter of but a moment and is very conveniently accomplished as will be readily apparent.

Having thus described my invention, what I claim and desire by Letters Patent to secure is:

1. The combination, in a pneumatic cleaning implement, of a hollow suction head having an inlet orifice, and an attachable and detachable tool having two relatively movable parts embracing said head adjacent to said orifice, said tool having resilient means to hold said parts in contact with opposite sides of said head.

2. The combination, in a pneumatic cleaning implement, of a hollow suction head having an inlet orifice, and an attachable and detachable tool having fibrous material thereon and having two resiliently connected parts yieldingly engaging opposite sides of said head adjacent to said orifice.

3. The combination, in a pneumatic cleaning implement, of a hollow suction head having an inlet orifice, and an attachable and detachable tool having two relatively movable parts embracing said head adjacent to said orifice, said head and said tool having complementary interengaging means, and resilient means to hold said interengaging means in interengagement with each other.

4. The combination, in a pneumatic cleaning implement, of a hollow suction head having an inlet orifice, and an attachable and detachable tool having two relatively movable members engaging opposite sides of said head adjacent to said orifice, two rods connecting said members to each other, and springs urging said members toward each other.

5. The combination, in a pneumatic cleaning implement, of a hollow suction head having an inlet orifice, and an attachable and detachable tool having two relatively movable members engaging opposite sides of said head adjacent to said orifice, two rods connecting said members to each other, means for limiting the movement of said members toward each other, and springs urging said members toward each other.

6. The combination, in a pneumatic cleaning implement, of a hollow suction head having an inlet orifice, and an attachable and detachable tool having two relatively movable members engaging opposite sides of said head adjacent to said orifice, two rods connecting said members to each other, tubes surrounding said rods, respectively, adapted to limit the movement of said members toward each other, and springs urging said members toward each other.

In testimony whereof I have hereunto set my hand in presence of two subscribing witnesses.

ROY C. BAKER.

Witnesses:
   Louis A. Jones,
   Sadie V. McCarthy.